United States Patent [19]

Kimple

[11] Patent Number: 5,775,208
[45] Date of Patent: Jul. 7, 1998

[54] PIZZA PAN SYSTEM AND METHOD

[76] Inventor: Robert J. Kimple, 14620 Bayes Ave., Lakewood, Ohio 44107

[21] Appl. No.: 504,240

[22] Filed: Jul. 19, 1995

[51] Int. Cl.$^6$ .............. A47J 37/10; A47J 37/01; A22C 7/00
[52] U.S. Cl. ............ 99/422; 99/430; 99/432; 99/DIG. 15; 220/23.6; 220/912; 206/508
[58] Field of Search ............ 99/430, 432, 439, 99/422, 426, 433, DIG. 15; 220/912, 23.6, 23.86; 206/508

[56] References Cited

U.S. PATENT DOCUMENTS

| Re. 17,066 | 8/1928 | Smythe | 99/430 |
|---|---|---|---|
| D. 273,168 | 3/1984 | Bowen et al. | |
| D. 274,495 | 7/1984 | Bowen et al. | |
| 305,674 | 8/1884 | Dalzell | 220/23.86 |
| D. 311,849 | 11/1990 | Strand | |
| 385,683 | 7/1888 | Phelps | 99/439 |
| 741,348 | 10/1903 | Lane | 220/912 |
| 1,543,221 | 6/1925 | Matson | 99/383 |
| 1,602,053 | 10/1926 | Steinruck et al. | 220/912 |
| 1,771,374 | 7/1930 | Burkard | 99/430 |
| 1,781,302 | 11/1930 | Roberts | |
| 1,832,117 | 11/1931 | Henning | |
| 2,158,911 | 5/1939 | Pellar | 99/430 |
| 2,179,512 | 11/1939 | McBirney | |
| 2,188,757 | 1/1940 | Moon | 99/422 |
| 2,346,839 | 4/1944 | Harriss et al. | 99/439 |
| 2,582,692 | 1/1952 | Funke | 99/383 |
| 2,811,152 | 10/1957 | Wicks | |
| 3,347,181 | 10/1967 | Pizzo | |
| 3,348,716 | 10/1967 | Nakata | 220/23.86 |
| 3,532,247 | 10/1970 | Bridges | 220/23.6 |
| 3,987,719 | 10/1976 | Kian | |
| 4,080,884 | 3/1978 | Terrell | |
| 4,176,591 | 12/1979 | Power | |
| 4,184,421 | 1/1980 | Ahlgren | |
| 4,220,134 | 9/1980 | Snyder | 99/428 |
| 4,367,243 | 1/1983 | Brummett et al. | |
| 4,563,946 | 1/1986 | Barlow et al. | |
| 4,649,053 | 3/1987 | Lamonica | |
| 4,694,961 | 9/1987 | Mendez | 220/23.6 |
| 5,065,889 | 11/1991 | Conti | 220/912 |
| 5,213,028 | 5/1993 | Chang | 220/912 |

FOREIGN PATENT DOCUMENTS

| 73348 | 7/1928 | Sweden | 99/422 |
|---|---|---|---|
| 19654 | of 1903 | United Kingdom | 99/433 |
| 231965 | 4/1925 | United Kingdom | 220/23.86 |
| 345443 | 3/1931 | United Kingdom | 220/23.86 |

*Primary Examiner*—Tony G. Soohoo
*Attorney, Agent, or Firm*—Renner, Otto, Boisselle & Sklar, P.L.L.

[57] ABSTRACT

A pizza pan system includes a pizza pan including a bottom wall, a side wall circumferentially about the bottom wall such that the bottom wall and side wall cooperate to define an area for containing pizza dough, and a rim circumferentially about the outer edge of the side wall; and a lid-like member mating with said rim enabling pizza dough to be compressed between said lid-like member and said rim to produce single-crusted, fold-over or double-crusted pizzas. The system allows storage of panned pizza dough within a substantially air tight chamber. The pans of the system can be stacked to economize on countertop or storage space. The area for confining pizza dough allows, in conjunction with a trimming means, consistent reproduction of aesthetically pleasing pizza shapes. A method of preparing pizza includes rolling dough, placing the dough in a pizza pan, and placing a lid over the pizza pan to compress, shape, conform and trim dough about a rim area of the pizza pan and lid.

11 Claims, 9 Drawing Sheets

PIZZA PAN SYSTEM AND METHOD

FIELD OF THE INVENTION

The present invention relates to pizza pans and systems, pizza preparation and cooking, and methods for facilitating pizza preparation and cooking.

BACKGROUND

Conventional pizza pans generally produce flat pizza pies. In order to prevent pizza toppings from oozing over the edge of the crust (and thereby dirtying the pan and oven, as well as harming the flavor and appearance of the pizza), a toppingless section of crust is typically maintained. This toppingless crust area is considered unpalatable by many consumers, and is often uneaten and discarded.

Storage of pans of uncooked dough is also a problem in conventional pizza pan systems, resulting in a requirement for large areas of counter, refrigerator and/or freezer space devoted to pan storage, or else necessitating the use of additional devices such as metal racks to stack the pans. In addition, in conventional pizza pan systems pans of uncooked dough are either left uncovered, resulting in accelerated drying out and crusting of the dough, or else must be covered by the use of kitchen foils and films, plastic trays/containers and lids, or make-shift devices.

SUMMARY

According to an aspect of the invention, a pizza pan comprises a bottom wall; a side wall circumferentially about the bottom wall such that the bottom wall and side wall cooperate to define an area for containing pizza dough; and a seal area for cooperating with a lid-like member to form a seal about the perimeter of the pan.

According to an aspect of the invention a pizza pan comprises a bottom wall; a side wall circumferentially about the bottom wall such that the bottom wall and side wall cooperate to define an area for containing pizza dough; and a trimming means to trim the dough to the desired shape about the perimeter of the pan.

According to an aspect of the invention, a pizza pan system comprises a pizza pan including a bottom wall; a side wall circumferentially about the bottom wall such that the bottom wall and side wall cooperate to define an area for containing pizza dough; and a rim circumferentially about the outer edge of the side wall; and a lid-like member mating with said rim enabling pizza dough to be compressed between said lid-like member and said rim to produce single crust, fold-over or double-crusted pizzas.

According to an aspect of the invention, a pizza pan system comprises a pizza pan including a bottom wall; a side wall circumferentially about the bottom wall such that the bottom wall and side wall cooperate to define an area for containing pizza dough; and a rim circumferentially about the outer edge of the side wall; and a lid-like member mating with said rim and having a wall cooperative with the pizza pan for stacking plural systems.

According to an aspect of the invention, a pizza pan comprises a bottom wall; a side wall circumferentially about the bottom wall such that the bottom wall and side wall cooperate to define an area for containing pizza dough; and a means to restrain the dough from drying, crusting and/or over-rising.

According to an aspect of the invention, a pizza pan comprises a bottom wall; and a side wall circumferentially about the bottom wall and cooperative with the bottom wall for containing pizza dough, the side wall having an upturned portion to prevent spillage of the pizza toppings/juices during cooking.

According to an aspect of the invention, a pizza pan comprises a bottom wall; a side wall circumferentially about the bottom wall such that the bottom wall and side wall cooperate to define an area for containing pizza dough; a rim circumferentially about the outer edge of the side wall; and a lid-like member attached to the underside of the bottom wall, cooperative with another pan for stacking plural pans.

According to an aspect of the invention, a method of preparing pizza comprises rolling dough, placing the dough in a pizza pan, and placing a lid over the pizza pan to compress dough about a rim area of the pizza pan and lid.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

DESCRIPTION

Figure 1:
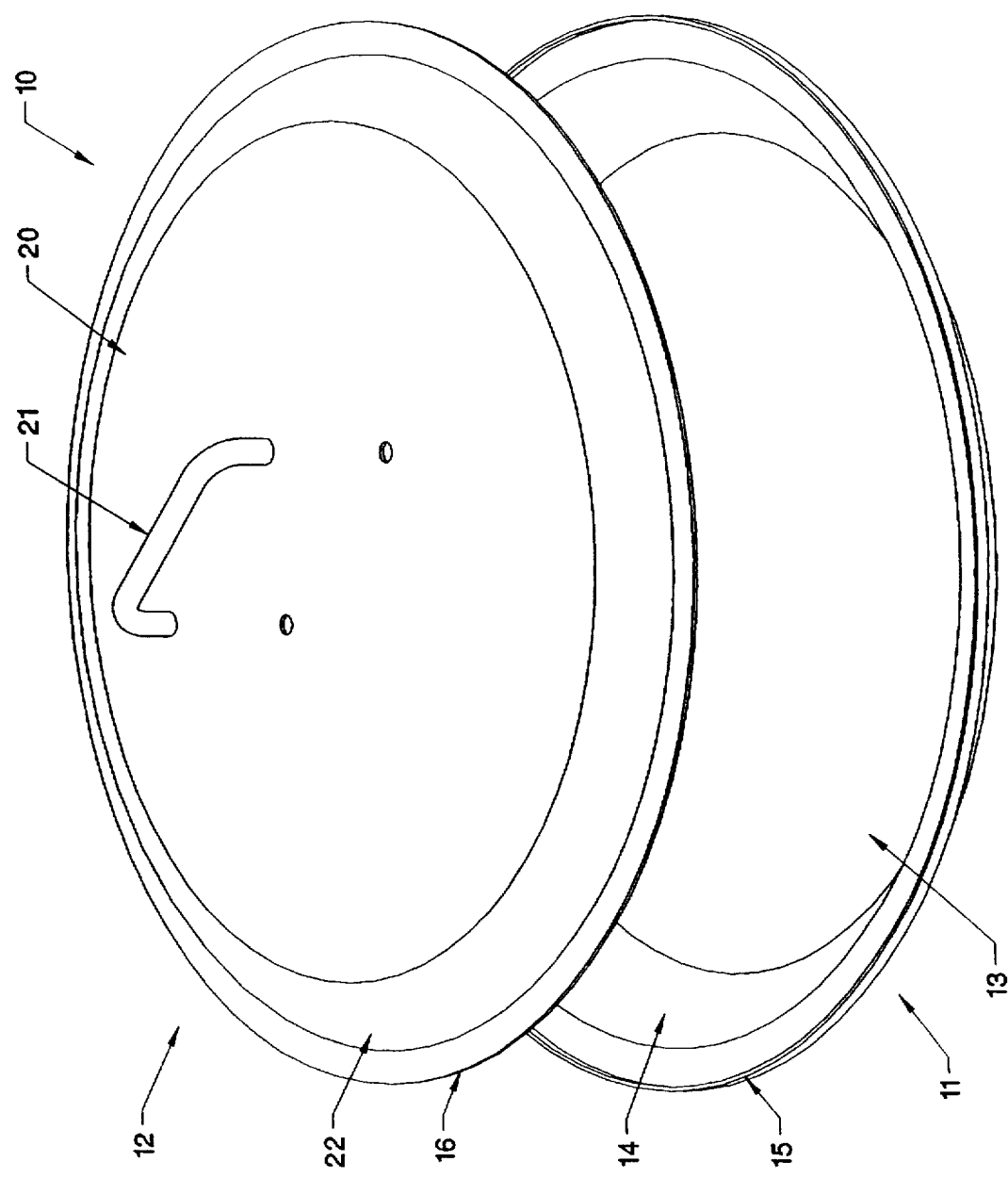
FIG. 1 is a top exploded perspective view of one embodiment of the pizza pan system of the present invention.

Referring in detail to the drawings, wherein like reference numerals designate like parts in the several figures, and initially to FIG. 1, a pizza pan system 10, comprising a pan 11 and lid 12, is shown. The pan 11 has a bottom wall 13, which may be solid or perforated, and which may or may not be substantially flat, which cooperates with a side wall 14, about its perimeter, to define an area upon which pizza dough is placed for spreading, preparing, e.g., applying toppings, etc., and/or cooking. The side wall is shown as curved, although it could be sloped or even a more complex shape. The upturned side wall 14 provides a dam against spillage of pizza contents during cooking. Preferably, though not necessarily, the pan 11 has a rim 15 at the top of side wall 14; such a rim may provide a mating surface for the sealing flange 16 of lid 12, as well as providing a convenient means for trimming away excess pizza dough.

Figure 2:
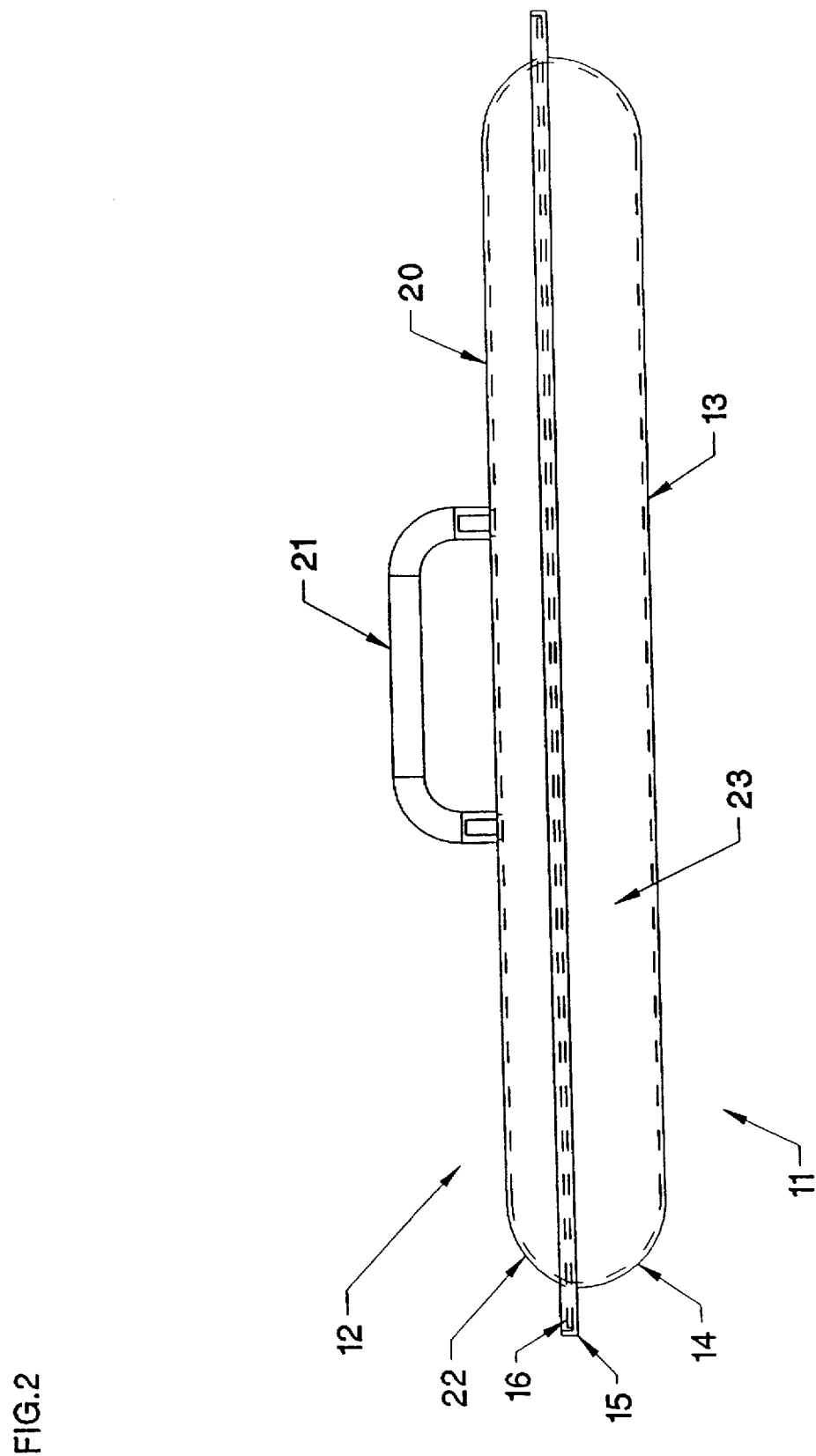
FIG. 2 is a side sectional view of the pizza pan system of FIG. 1.

The lid 12 has a top wall 20 to which a handle 21 (or other means of manipulating the lid) may be attached. The handle 21 may be optional; it may be removable. Along the perimeter of top wall 20 a side wall 22 is attached. Top wall 20 and side wall 22 of lid 12, in conjunction with bottom wall 13 and side wall 14 of pan 11, combine to define a cooking volume 23 (FIG. 2) in which the pizza is cooked. When no handle is secured to the lid, the lid has a shape with a flat wall 20 and side wall 22; inverting the lid, then, enables the lid to be used as a pizza pan itself. This use can be advantageous particularly when all other pans 11 already are in use, or, when the user requires a pan of shallower depth.

If the lid 12 does not have a handle sticking up from the top 20, then the top 20 is a generally flat surface. The lid then may be used to support a pizza pan 11 on a table where the pizza is to be served. For example, the lid 12 may be placed on the table with the flange 16 against the top surface of the table. The pizza pan 11 may be placed with the bottom wall 13 thereof against the wall 20 of the lid 12 for support therefrom. Since the flange 16 is spaced away from the wall 20 of the lid 12 by the side wall 22, a volume or dead air space is provided between the wall 20 and the surface of the table. Such space provides thermal insulation that tends to resist the transfer of heat from the pizza and pizza pan to the table. Additionally, the relatively wide area of the flange 16 allows it to be supported on the surface of a table without presenting a sharp edge that could scratch or otherwise damage the table surface. Pan 11 may be spot-welded to lid 12 as a permanent assembly.

Figure 3:
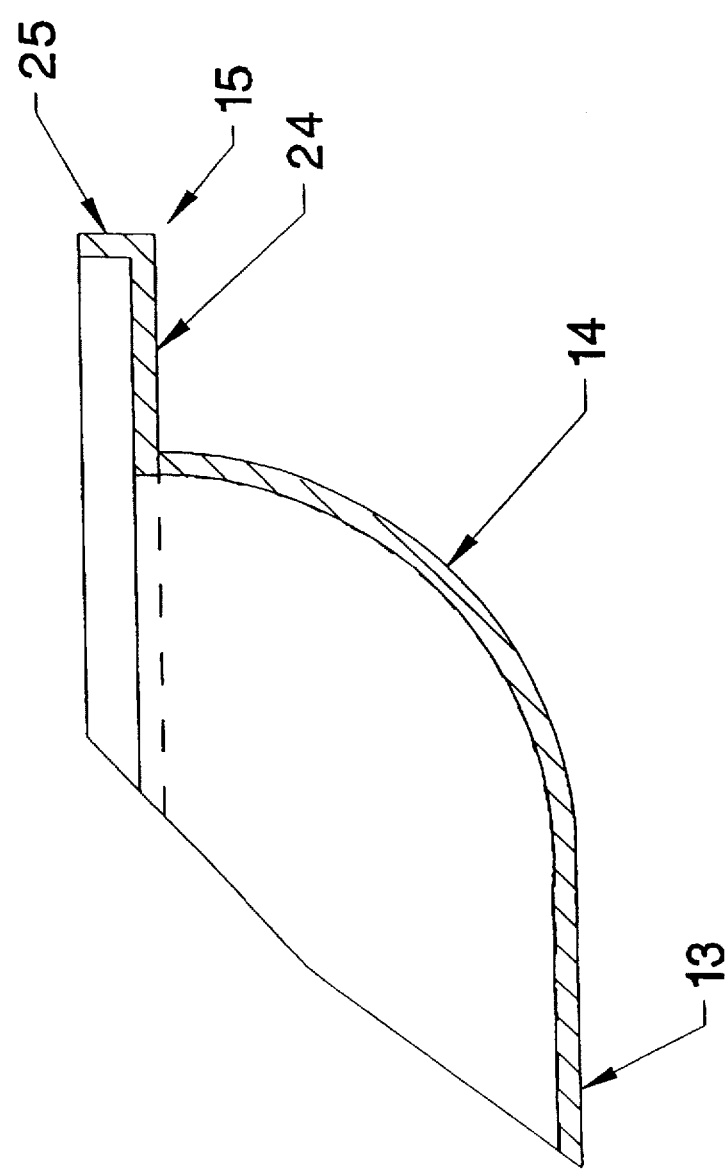
FIG. 3 is a side sectional view of the side wall and rim of a pizza pan useful in the system of FIG. 1.
Figure 4:
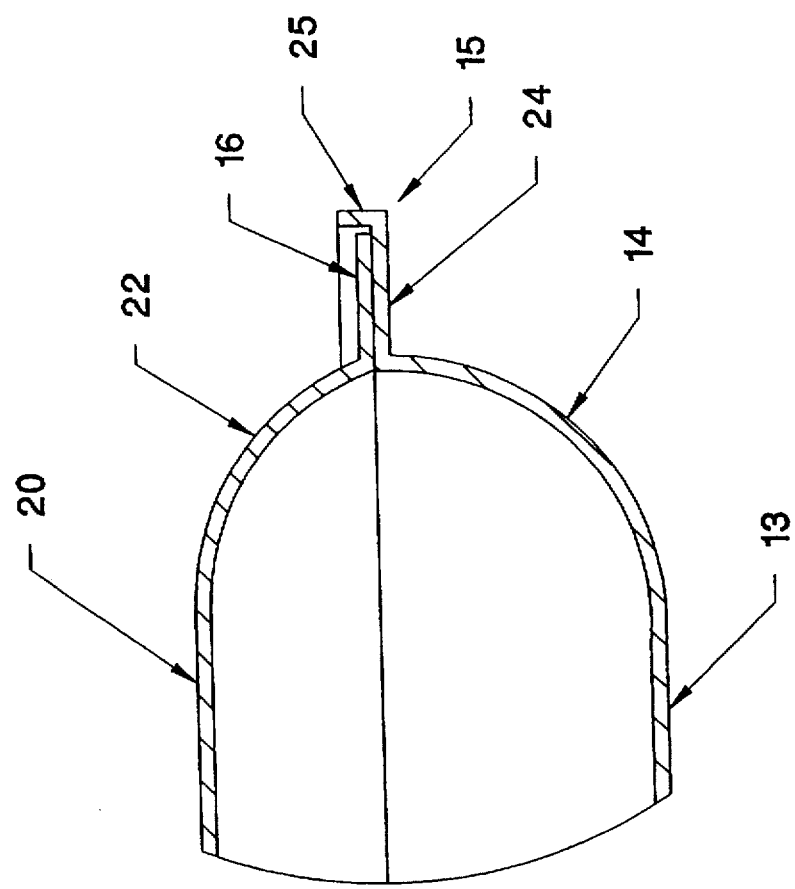
FIG. 4 is a side sectional view of the seal area formed by the mating of the pan and the lid-like member of the system of FIG. 1.

The rim 15 of pan 11 comprises a stepped wall with a seat 24 and a rim wall 25 (FIG. 3). The seat 24 mates with sealing flange 16 of lid 12 (FIG. 4), allowing compression of pizza dough between seat 24 and sealing flange 16 for the purposes of providing steady, uniform pressure for crimping and shaping the crimp of the dough/crusts of any pizza, and especially double-crusted or fold-over pizzas or pizza-like products such as focaccias, calzones, neapolitans, and rusticas. The rim wall 25 keeps the lid 12 centered over pan 11, and acts, in a knifing action, to trim excess dough.

When making a pizza, the dough may be spread along the bottom wall 13 of the pan 11 and up along the side wall 14. Additionally, some of the dough also may be spread onto the seat 24 of the rim 15. The flange 16 of the lid 12 may be pressed against the dough in the area of the seat 24. Such pressing may cause the cutting of the dough so that some of the dough is squeezed out above the rim 15 wall 25, and/or so that some of the dough may be urged back into the cooking volume 23, for example, along the side wall 14. The cooperation between the flange 16, seat 24, and rim wall 25 provides a substantially accurately-shaped pizza in the shape of the circular (or other) outline of the pan, for example, the outline at the top of the side wall 14. Additionally, the flange 16 of the lid 11 and the seat 24 and/or rim wall 25 may cooperate with some of the dough therebetween to provide a seal that is substantially air tight. Extra dough hanging over the rim wall 25 may be trimmed after such seal has been formed to provide the circular shape mentioned above. The seal helps to prevent air from entering the cooking volume 23 and causing drying, crusting, and/or other effects when the dough is stored or cooked. Thus, the seal may tend to prevent moisture loss from the pizza dough when it is being stored.

The pizza dough tends to expand while it is baked. The curvature of the side wall 14 of the pan 11 and the distance between the top of that side wall and the bottom wall 13 of the pan 11 allows pizza dough to be pressed against the side wall and to form a wall of dough which tends to retain cheese and/or other toppings or other ingredients on the pizza that is flat against the bottom wall 13 and in any event away from the side wall 14. During cooking, the cheese and possibly other ingredients may release a liquid-like grease, juice or oil, or excess moisture. In the past, such oil/moisture might burn when contacting the hot wall of a pizza pan. By providing the upstanding wall of dough mentioned, the liquid-like grease/juice/oil or excess moisture is kept away from the side wall and the bottom wall, too, of the pizza pan. Furthermore, as the pizza dough shrinks during cooling, for example, leaving a gap between the upstanding dough wall and the side wall 14, grease, juice tends not to spill into that gap area due to the containment provided by the upstanding dough wall.

The aforementioned trimming by the flange 16, seat 24 and rim wall 25 helps assure the pizza will have an aesthetically pleasing shape conforming thereto, e.g., circular or some other shape. The curvature of the side wall guides and supports the pizza crust during baking so such shape tends to be maintained. Also, since juices tend to be blocked from engaging the hot pan, burning of the pizza crust where juices interface between the dough and pan is avoided, thus further enhancing the pleasant aesthetics of appearance and odor of the pizza.

The upstanding rim wall 25 provides a still further barrier to prevent grease, juice and/or other material, such as dough or other ingredients or toppings on the pizza, from overflowing or spilling beyond the pan 11 onto a surface of the cooking oven, conveyer belt carrying the pizza pan through a pizza oven, etc. Such spillage in the past would tend to burn on the oven surface, for example, and by preventing such spillage and, thus, burning, the cleanliness of the oven equipment can be maintained relatively easily.

Figure 5:
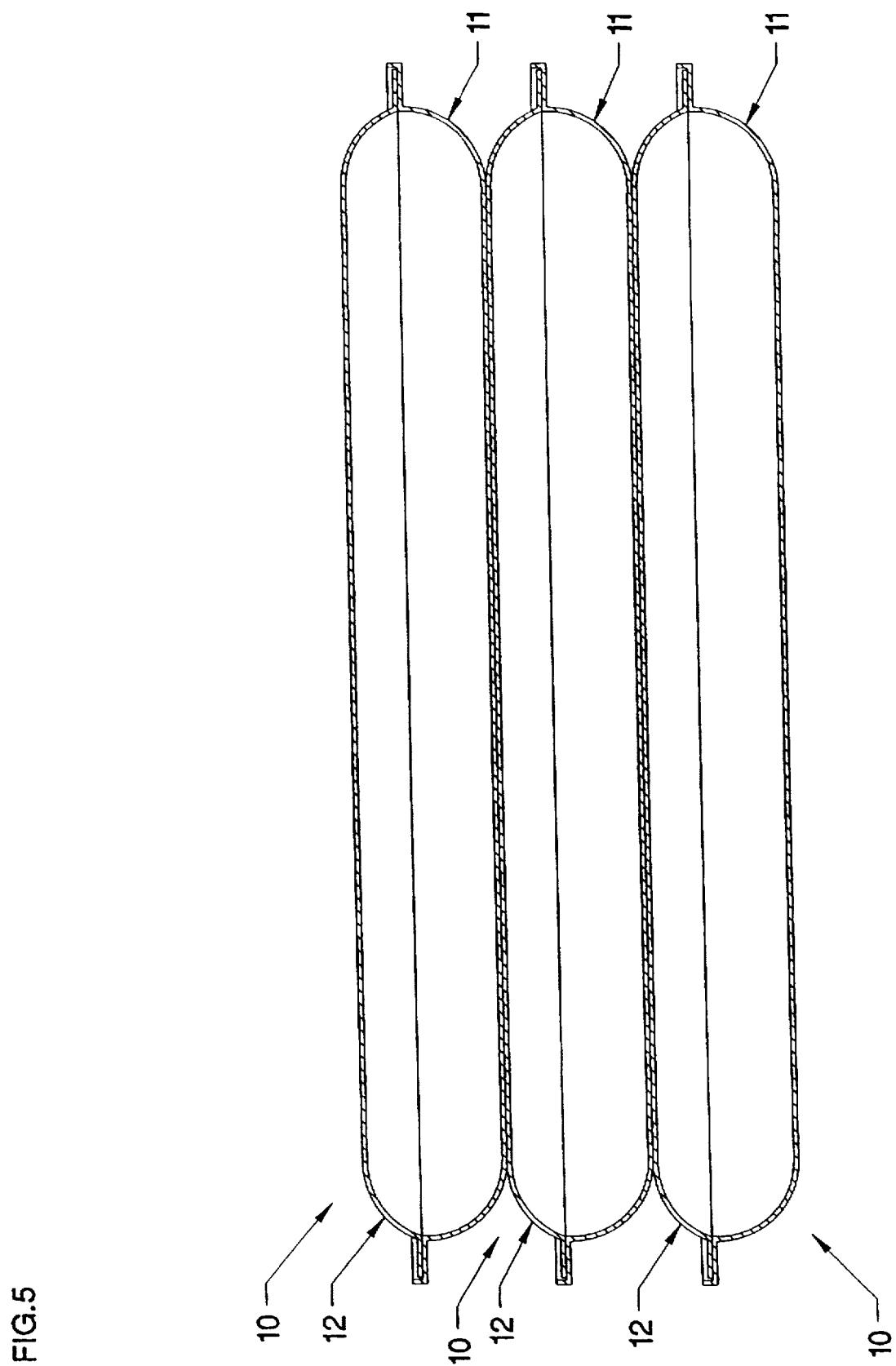
FIG. 5 is a side sectional view of a plurality of stacked pan/lid combinations.

A plurality of combinations of pans 11 and handleless lids 12 can be stacked (FIG. 5). This stacking minimizes the space required (such as countertop, refrigerator, or freezer space) when multiple pans are used to prepare pizzas prior to cooking, storing panned dough in a refrigerator or freezer, or to store pizzas after cooking.

Figure 6:
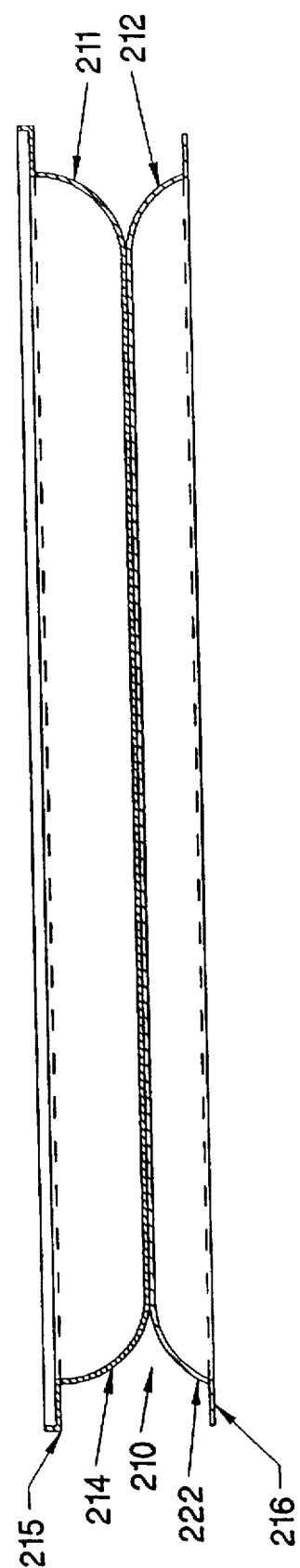
FIG. 6 is a side sectional view of an attached pan/lid combination embodiment of the present invention.

In another embodiment of the invention (FIG. 6) a pan/lid combination 210 comprises a lid 212 attached to the underside of a pan 211. The pan 211 has a side wall 214. The lid 212 has a side wall 222, preferably but not necessarily of a different shape than side wall 214. When the lid/pan combination 210 is inverted, the lid 212 can function as a separate pan, thus increasing the variety of pizza sizes and shapes available (if the lid 212 and the pan 211 are of different shape), and increasing the useful life of the pan before cleaning is required, since two cooking surfaces are available instead of one. Also, the attached lid 212 at the bottom of the pan 211 may serve as a stand to support the pan above the surface of a table. The side wall 222 of the lid supports the pan 211 above the table providing a dead air space below the pan bottom wall which provides a thermal insulating effect from the table to help keep the pizza warm with the pan 211 and lid 212 so secured, the pan and pizza cannot slide off the support.

Pan 211 has a rim 215 attached to the top of side wall 214, for mating with a lid (such as lid 12 shown in FIG. 1). Lid 212 could have an identical rim, enabling both pans of the pan/lid combination 210 to mate with the same lid.

Figure 7:
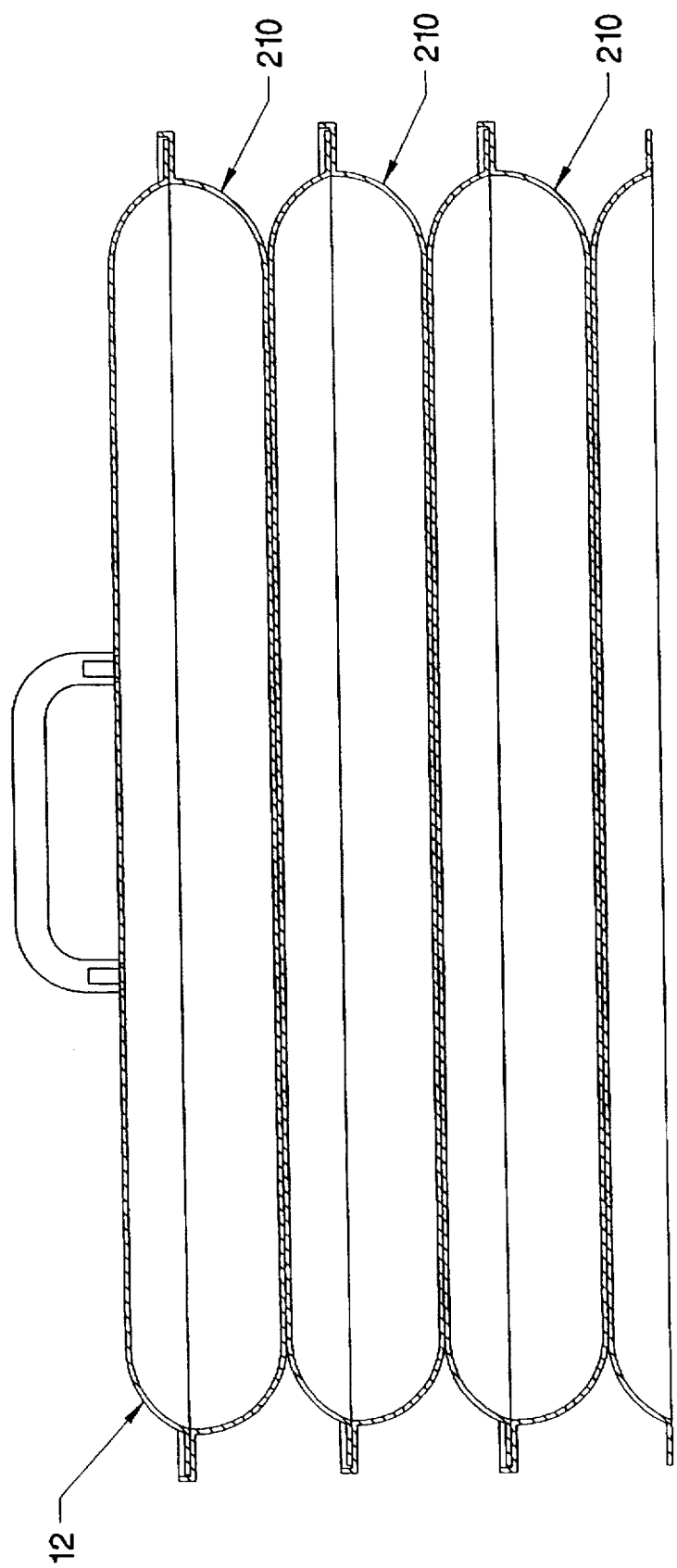
FIG. 7 is a side sectional view of a plurality of nested pan/lid combinations.

However, in the preferred embodiment lid 212 has a sealing flange 216, which allows a plurality of pan/lid combinations 210 to be stacked to facilitate storage when a plurality of pans are being used to prepare pizzas (FIG. 7). A stack of pan/lid combinations 210 is topped with a lid (such as lid 12 shown in FIG. 1).

Figure 8:
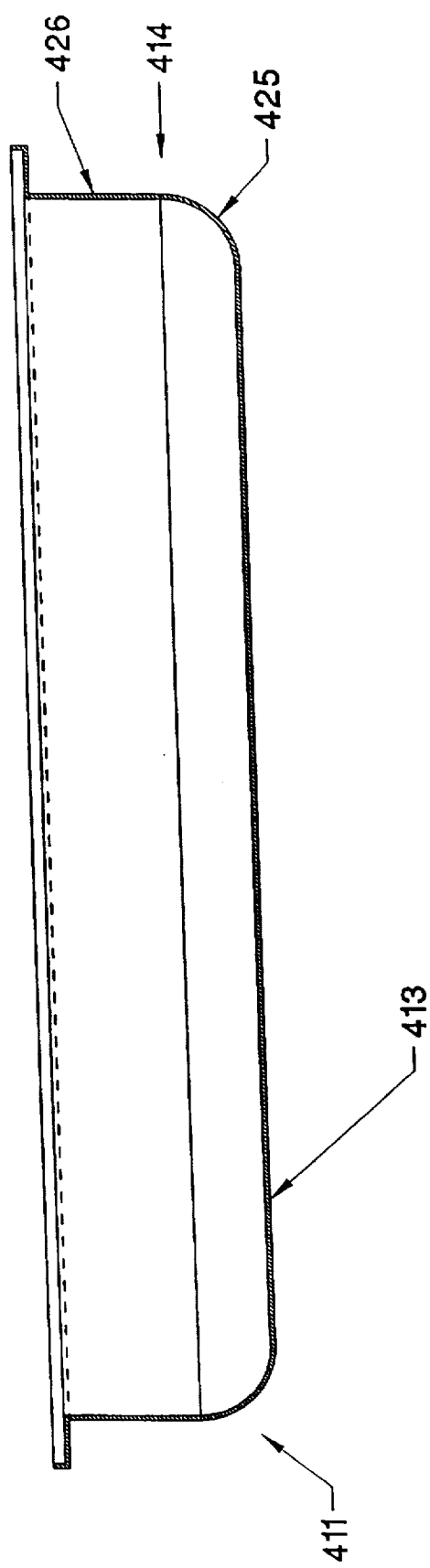
FIG. 8 is a side sectional view of a modified, "traditionally-styled" pie pan embodiment of the present invention.

An additional embodiment of the invention is a modified traditionally shaped (pie) pan 311 (FIG. 8), comprising a bottom wall 313 and side wall 314, wherein the side wall 314 includes a curved portion 325 (which could also be sloped or of a more complex shape) and an substantially straight portion 326.

Figure 9:
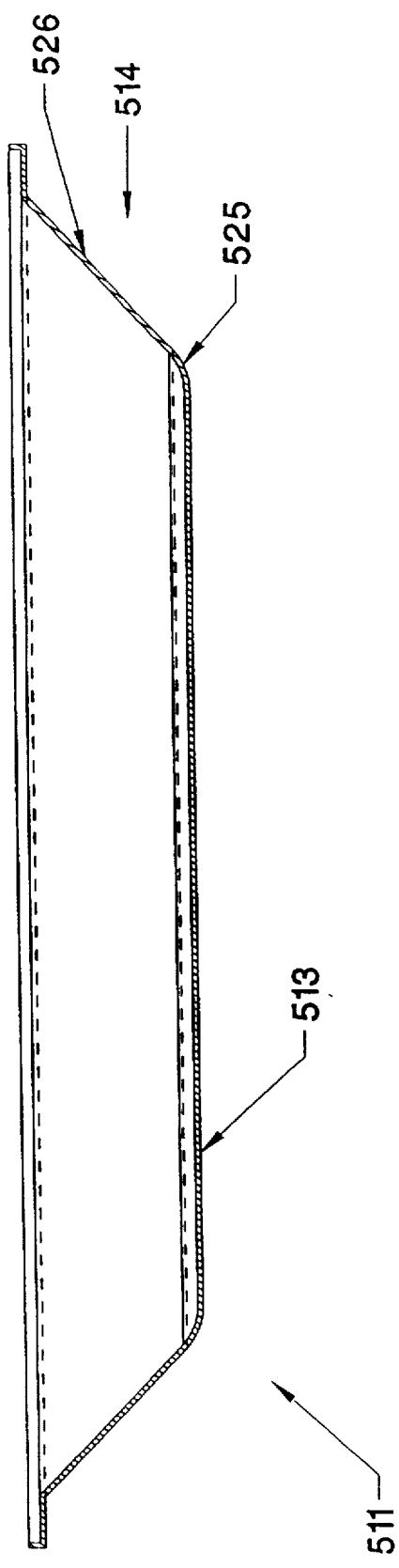
FIG. 9 is a side sectional view of a modified, "deep dish" pan embodiment of the present invention.

An additional embodiment of the invention is a deep dish pan 411 (FIG. 9), comprising a bottom wall 413 and side wall 414, wherein the side wall 414 includes a curved portion 425 (which could also be sloped or of a more complex shape) and an substantially straight portion 426.

A number of advantages inure to the pizza pan system 10 of the present invention. Some of these advantages are with respect to storage, use, and resulting product, such as the pizza itself.

For example, the relationship of the flat bottom wall 13 and sloped side wall 13 facilitates stacking of plural pans 11 for storage. Stacking reduces the amount of space required for storage, and facilitates organization during pizza preparation. Also, a pizza pan system 10 having a flat bottom wall 13 on the pan 11 and a flat top wall 20 on the lid 12 enables a plurality of such assembled systems to be stacked for storage, for example, as is depicted schematically in FIG. 5. If a system 10 includes uncooked pizza dough or already cooked pizza, the closed system depicted in FIG. 5, for example, can be used for relatively long term storage providing protection of the dough or pizza from dirt, damage, etc. Also, with the pan 11 and lid 12 assembled in the manner shown in FIG. 5, for example, the two may form a relatively effective seal tending to prevent air from entering the interior volume where pizza dough or pizza is contained and also to tend to prevent drying of that material, for example, due to storage in a frost-free type refrigerator or freezer. Further, the confined space within the pan system 10 including an assembled pan 11 and lid 12, for example, as is shown in FIG. 5, may help to prevent undesired rising of the dough while it is stored either at room temperature or in a cooled environment. Being able to store the dough in the relatively isolated interior of a pan system 10 facilitates storage, including relatively long term storage, while the dough is ready for preparation and cooking relatively conveniently. This capability tends to minimize the time required to prepare a pizza because the dough can be prepared in advance and maintained in a controlled environment ready for use.

The pizza pan system 10 is strong and durable. It can be made, for example, of hard aluminum alloy, stainless steel, or of another suitable material able to withstand the temperatures at which pizza is baked, for example. Preferably the material of which the pan is made can be cleaned relatively easily. Also, preferably there are no small areas in the surface of the pan, such as folded, bent, cast, molded, etc. metal parts that would facilitate food becoming stuck and difficult to clean.

The various parts of the pizza pan system 10, etc., of the several embodiments disclosed herein may be interchangeable. In particular, the lid 12 may be used with a regular crust or "deluxe" pan, such as that shown in FIG. 1, or with a modified, "traditional style" pan, such as that shown in FIG. 8 or a deep dish pan, such as that shown in FIG. 9. The trimming, shaping, cutting and crimping actions of the pizza pan system may be employed in the various embodiments and combinations of the pizza pan system hereof.

In using the pizza pan system 10 or one of the other systems disclosed herein, for example, pizza dough is prepared and placed on the bottom wall 13 of the pan 11. The pan may be first rubbed or brushed with olive oil or the like applied to the inner surface against which the dough is to be placed. The dough preliminarily may be rolled out on a rolling sheet and it then is placed in the center concavity of the baking pan 11. The edges of the dough preferably will droop over the top of the rim wall 25. Preferably the dough is drawn up evenly over that rim wall 25 and air is let out so that it is not trapped between the dough and the pan. The dough will tend to conform to the shape of the pan. The lid 12 then is placed over the pan 11 and is aligned so the flange 16 will fit in the area of the step 24 and rim wall 25. The lid 12 is pressed against the ledge 24 to crimp the dough, shaping it and trimming it. After the lid has been seated on the pan in the above manner, a hand or a tool can be used to peel any excess dough away from the edge of the pan, removing that dough for later use.

Inside the pizza pan 10, then, is a "panned" portion of dough. It is ready for prepping by adding sauce, cheese, toppings, etc. for immediate baking or at a later time in the same day. Alternatively, the dough can be refrigerated or frozen by placing it still in the pan into a refrigerator or freezer, respectively. In a refrigerator the dough will keep for a few days, although some rising may occur depending on the dough recipe and how cold is the ambient temperature of the refrigerator is. In a freezer, rising would not occur, other than possibly for a short initial time until freezing has been completed. With the lid 12 in place on the pan 11 to form the pizza pan system 10, the dough is maintained in the volume 23 in a relatively sealed, air-tight relation away from the external environment.

If the dough has been frozen, it can be defrosted while still in the pan, proofed, topped with sauce, cheese, toppings, etc., and then baked.

During the baking the walled effect provided by the pizza dough along the side wall 14 of the pan 11 tends to prevent grease, juices and the like from dripping into the pan, and such pizza dough wall and the ledge 24 and rim wall 25 also may cooperate to prevent such oozing or dripping into the oven, etc., as was mentioned above.

In instances where a double-crusted (multi-layer) pizza style dough is used, the cooperative relation of the lid 12 and pan 11, especially of the lid flange 16 and the ledge 24 and rim wall 25 may be used to press the layers of dough together in effect tending to seal, crimp and combine them as a unitary material. Also, it will be appreciated that although the illustrated embodiment of the invention employs a pizza pan system having circular plan shape, other shapes may be used, such as rectangular, other polygon or some other plan shape, as may be desired.

The pizza pan and method described may be used to prepare, to store, to bake, to re-heat, to serve, and to re-store pizza or other product.

I claim:

1. A pizza pan comprising:

a bottom wall;

a side wall about the periphery of the bottom wall, said bottom wall being in cooperative relation with said side wall to bound an area for containing pizza dough;

a rim extending outward substantially parallel to the bottom wall about the periphery of the side wall; and a lid-like member attached to the underside of the bottom wall, said lid-like member being cooperative with another pan for stacking multiple pans.

2. The pan of claim 1, said rim mating with said wall of said lid-like member to press against pizza dough to compress the dough to produce fold-over and/or double-crusted pizzas.

3. The pan of claim 1, said bottom wall being substantially flat.

4. The pan of claim 1, further comprising a trim means for trimming the dough to a consistent and repeatable shape about the perimeter of the pan.

5. The pan of claim 4, the lid-like member cooperating with the rim of another pan to trim shape and conform the dough at the trim means.

6. The pan of claim 1, further comprising a top wall and a peripheral sealing flange means for cooperating with said rim to form a seal therewith to seal a top pan of a plurality of a stack of pans.

7. The pan of claim 6 the top wall having a handle to facilitate placing the top wall with respect to the rim to trim, shape and conform the dough.

8. A pizza pan comprising:

a bottom wall;

a side wall circumferentially about the bottom wall such that the bottom wall and side wall cooperate to define an area for containing pizza dough;

a rim circumferentially about the outer edge of the side wall; and a lid-like member attached to the underside of the bottom wall, cooperative with another pan for stacking plural pans, and wherein said lid-like member comprises:

a top wall; and a side wall about the periphery of the top wall such that when said pan is inverted, the top and side walls of the lid-like member cooperate to form an area for containing pizza dough.

9. The pan of claim 8 wherein said rim comprises a seat parallel to the bottom wall and a rim wall, perpendicular to the bottom wall, about the outer edge of the seat.

10. The pan of claim 9 wherein the portion of the lid-like member which mates with the rim of another pan comprises a flange parallel to the bottom wall.

11. The pan of claim 10, said flange mating with the rim of another pan to form a seal about the perimeter of the pan to form a hermetic chamber, to prevent spillage and to restrain the dough from over-rising.

* * * * *